Feb. 6, 1962 W. A. O'BRYANT 3,019,854
FILTER FOR HEATING AND AIR CONDITIONING DUCTS
Filed Oct. 12, 1959

INVENTOR.
Waitus A. O'Bryant
BY
ATTORNEY.

United States Patent Office 3,019,854
Patented Feb. 6, 1962

3,019,854
FILTER FOR HEATING AND AIR CONDITIONING DUCTS
Waitus A. O'Bryant, 8745 Mission Road, Kansas City 15, Kans.
Filed Oct. 12, 1959, Ser. No. 845,994
1 Claim. (Cl. 183—49)

This invention relates to dust filters for heating and air conditioning ducts and refers more particularly to an improved filter construction adapted to provide a complete circumferential seal in fluid flow ducts of all types and forms, including any gas flow ducts in which filters are employed to block passage of undesirable particles and substances.

The filters conventionally employed to remove dust from the air passing through heating, ventilating and air conditioning ducts ordinarily lose a great deal of their effectiveness by reason of the fact that the filter media (glass fibers, synthetic fibers, mineral wool or the like) is carried by a frame which is slightly smaller than the duct in which it is inserted, thereby permitting a considerable amount of air to bypass the filter by leaking around the margin of the frame rather than passing through the filter media. In other applications, when gas flows of various sorts are being passed from one point to another, it is often desired to provide complete and thorough filtering without bypassing any portion of the gas flow around the filter.

An object of the invention, therefore, is to provide a filter construction for use in fluid flow ducts of various types which prevents bypassing of the fluid around the filter, yet provides adequate flow passage of the filtered fluid comparable to conventional filter means.

Another object of the invention is to provide filter means for fluid flow ducts which are sufficiently rigid to be fixedly positioned across the ducts and retain their size and position therein in the manner of conventional filters, yet which also provide structural means for completely sealing the filter means in the duct passage whereby to completely prevent bypassing fluid flow therepast.

Another object of the invention is to provide a filter construction in which the area of the filter media proper is greater than the inside cross-sectional area of the duct into which the filter is to be inserted, the unit being given the rigidity required to make it self-supporting by means of a frame spaced inwardly from the margin of the filter media itself.

Another object of the invention is to provide such a filter frame construction which may be employed, without limitation, with filter media of all types and which is usable over and over, thereby reducing the cost of installing new filters.

Another object of the invention is to provide filter means for use in fluid flow ducts of all types, including heating and air conditioning ducts, wherein flaccid, weak, flabby or resilient filter media may be employed in the filter with a supporting frame employed to support the filter in spaced relationship in the duct, the filter yet completely sealing and preventing bypassing of fluid flow therepast in the duct.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Figure 4:
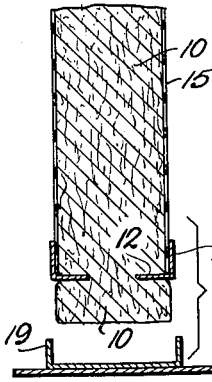
FIG. 4 is a side sectional fragmentary view through a typical fluid flow duct such as a heating or air conditioning duct showing the lower edge of the inventive filter means of FIG. 2 moving downwardly toward the positioning means for the filter in the fluid flow duct.
Figure 5:
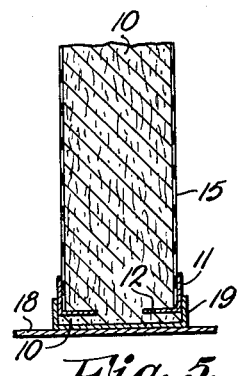
FIG. 5 is a view similar to that of FIG. 4 but with the inventive filter means positioned in the filter receiving construction in the fluid flow duct.
Figure 6:
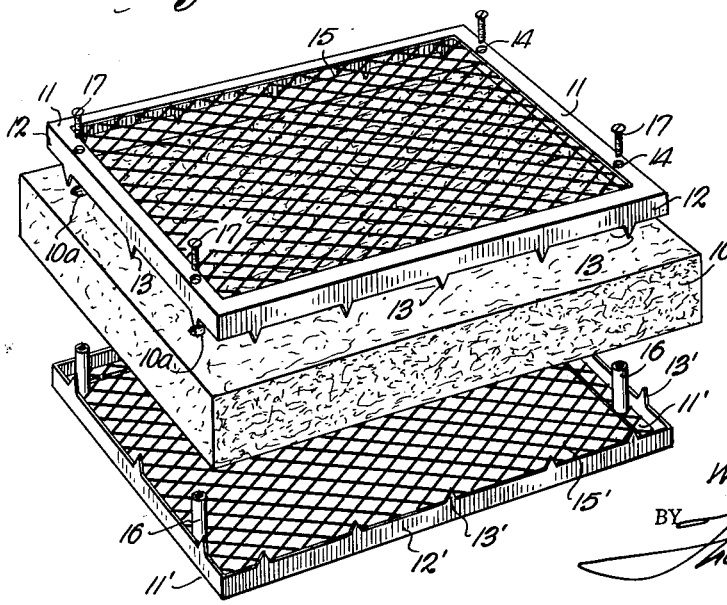
FIG. 6 is a perspective view from above of an exploded filter construction embodying the invention, the structure being that of the basic modification of FIGS. 2 and 3.

The construction of FIG. 6, being an exploded view of the basic modification of the invention shown in FIGS. 2-5, inclusive, will be first described. Referring, then, to FIG. 6, at 10 is shown a rectangular bat or mat of any suitable filter material or media for any desired fluid. For example, but not limiting, bat 10 may comprise a Fiberglas mat of fine diameter glass fibers bonded together with a thermosetting plastic resin (such as phenolformaldehyde), a fiber mat of any synthetic fibers, mineral wool, etc. The density, resilience, fiber diameter, binder percentage composition, etc. of the mat 10 are not critical to the invention. However, it is considered that the mat or bat of filtering material or media employed in the inventive construction will often be too resilient, flaccid or weak to be ordinarily self-supporting in an air or fluid flow duct. As a specific example of a mat which would not be self-supporting, a three-micron diameter glass fiber mat with a phenolformaldehyde resin binder of a density of approximately three pounds per cubic foot may be considered. The shape of the mat or bat is shown in the figures as rectangular. Thus it would be used in a rectangular duct. However, it must be noted that the shape of the mat is to be regulated only by the form of the duct, that is, it should be congruent therewith (although equal to or larger in area), and no particular shape should be limiting. The thickness of the mat is governed by the filtering properties desired, the character of the mat and the character of the fluid. Holes or openings 10a may be formed by any suitable means or punched out of the mat or bat 10 to permit passage of screws and/or spacers as desired.

Framing or support means are provided, preferably positioned on each side of the mat or bat of filtering material. To conform to the requirements of the invention, the area of the framing means must be less than the area of the mat or bat. This is a characteristic best seen in FIG. 2 where the mat 10 extends circumferentially past the boundaries of the framing member. The framing member must have suitable perforations or access means to permit the fluid to be filtered to reach and pass through the mat 10. Additionally, there must be sufficient rigid structure in the framing means for it to be self-supporting and mat supporting when in place on the mat. It is specifically contemplated that the framing means be removable and replaceable over another bat, the original filtering bat being discarded with its entrained filtered out material. In the drawings, the parts of the opposed frame members are numbered the same, but primed. The frame members may be constructed of any suitable material including wire, expanded metal, plastic, Fiberglas, etc.

The framing means shown comprise a pair of hollow rectangular outer frames 11 and 11' having inwardly-turned circumferential flanges 12 and 12' thereon with teeth or projections 13 and 13' extending inwardly therefrom to engage the surface of the mat or bat. The frame edges are preferably but not necessarily turned in so long as the frames hold the media in place. The frames must hold the media so as to resist the normal air flow through heating and air conditioning ducts, resisting up to approximately one inch water or more. Normal flow does not exceed .06 to .08 inch. A plurality of spaced bolt or screw holes 14 and 14' are provided in the frames 11 and 11'. Flattened expanded metal screens or meshes 15 and 15' are attached to or positioned within the frames 11 and 11' and flanges 12 and 12'. Screens 15 and 15' overlay and contact the faces of the bat. Spacers 16 are internally threaded at both ends thereof and receive bolts 17 and 17' from both framing members.

Figure 3:
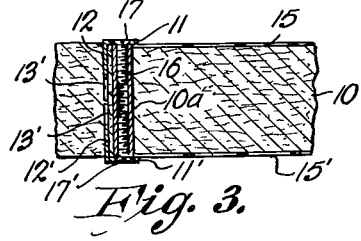
FIG. 3 is a view taken along the line 3—3 of FIG. 2 in the direction of the arrows.

FIG. 3 shows a section through the engaged mat illustrating the preferred manner of engagement of the mat or bat 10 by the flanges 12 and 12', prongs 13 and 13', spacers 16 and the bolts 17 and 17'. Thus it is seen that an extremely positive circumferential engagement of the entire mat or bat is provided, yet without severing, tearing or destroying the mat circumferentially of the framing members. Other types of fasteners, clamps, holders, etc. operative to hold the frames together may be employed.

Figure 2:
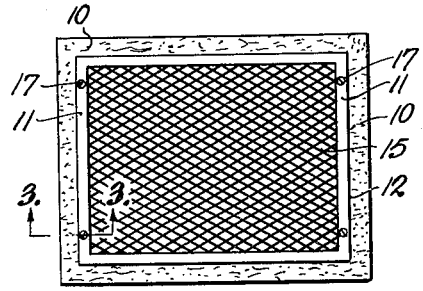
FIG. 2 is a view of a basic form of the inventive filter construction showing a rectangular filter adapted to be used in a fluid flow duct.

Referring to FIGS. 4 and 5, therein is shown the construction of FIGS. 2, 3 and 6 being positioned in an air conditioning duct having a positioning member 19 therein. The wall of the duct in both figures is indicated by the numeral 18 and the filter-receiving channel by the numeral 19. In FIG. 4, the filter is being lowered into place, while in FIG. 5, it is seen that the circumferential portion of the mat 10 past the frames is compacted within the channel with the frame 11 received in the channel proper as well. If channel 19 were not circumferential in the duct 18, or was not sealed, or if the frame members 11 would not tightly seal longitudinally in the channel, etc., leakage without using the instant inventive device would take place. However, the invention completely obviates this possibility.

Figure 1:
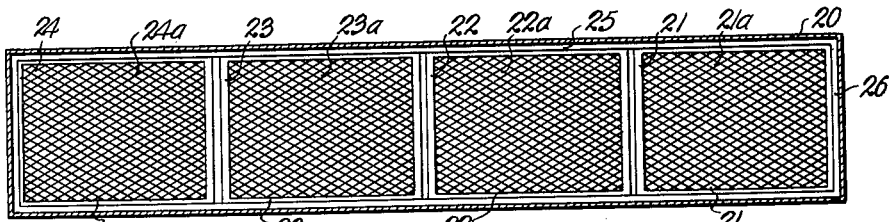
FIG. 1 is a front view of a multiple panel filter construction embodying the invention.

In FIG. 1 is shown a modification of the inventive construction wherein an elongate single piece 20 of mat of the character described is engaged by a plurality of individual frames 21, 22, 23 and 24, each comprising a rectangular frame of the structure of that of FIG. 2, with additional overlying framing members 25 and 26 positioning each regular frame system relative to the adjoining system or systems and all of them relative to one another. Connection and structure of the framing members of each individual system to one another is as in FIGS. 6 and 3, while the connection and structure of the overlying elongate frame members 25 and 26 may be also the same connected outside the individual frames. It should be noted, however, that (1) there is a circumferential extension of the entire mat 20 past all framing members and (2) between each individual framing system. Each individual framing system has its own screen or mesh 21a, 22a, 23a and 24a which operates in the same manner and is engaged by the individual system framing members as in the case of mesh 15 of FIGS. 2, 3 and 6. As the mat portions between the individual framing systems are maintained in rigidified state by the outer framing members 25 and 26, no mesh is required thereover and complete filtering without bypassing either peripherally or centrally of the mat 20 is achieved.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

A filter assembly comprising, in combination, a three dimensional body of resilient, deformable filter media of greater length than thickness having two substantially flat faces, a support structure adapted to removably engage the said body between two half portions thereof, one of said half portions abutting against each said flat face, each said support structure half portion comprising a continuous outline frame substantially congruent in form to that of the face of said mat it abuts against, yet so diminished in area dimensions as to be engageable with said face circumferentially substantially interior of the peripheral edge thereof, whereby to leave and provide a circumferential band of filter media surrounding each said half portion, each said outline frame of sufficient strength as to be self and mat supporting when in place on the latter, each said frame including a perforated screen received centrally thereof, each said frame having an inwardly extending circumferential flange thereon engaging said body, spaced teeth on the flange of each said frame adapted to penetrate and grip said filter media but not entirely penetrate therethrough, and means for releasably connecting each said outline frame with the other within the circumference of each said frame, said connecting means penetrating said body and rigidly spacing one frame from the other against compressive force.

References Cited in the file of this patent
UNITED STATES PATENTS

| | | |
|---|---|---|
| 1,566,607 | Jordahl | Dec. 22, 1925 |
| 2,124,370 | Gaarder | July 19, 1938 |
| 2,138,736 | Gaarder | Nov. 29, 1938 |
| 2,160,003 | Slayter et al. | May 30, 1939 |
| 2,182,501 | Quave et al. | Dec. 5, 1939 |
| 2,252,724 | Myers | Aug. 19, 1941 |
| 2,505,175 | Davis | Apr. 25, 1950 |
| 2,513,946 | Kliefoth | July 4, 1950 |
| 2,637,540 | Rowe | May 5, 1953 |